(12) United States Patent
Kundu et al.

(10) Patent No.: US 9,411,655 B2
(45) Date of Patent: Aug. 9, 2016

(54) SYSTEM AND METHOD FOR DETECTION AND DEPLOYMENT OF VIRTUALIZATION CAPABLE ASSETS IN A MANAGED DATACENTER

(75) Inventors: Anirban Kundu, DumDum Kolkata (IN); Sridhar Chakravarthy, Bangalore Karnataka (IN); Tushar Oza, Cedar Park, TX (US); Vaideeswaran Ganesan, Bangalore (IN)

(73) Assignee: DELL PRODUCTS, LP, Round Rock, TX (US)

( * ) Notice: Subject to any disclaimer, the term of this patent is extended or adjusted under 35 U.S.C. 154(b) by 996 days.

(21) Appl. No.: 13/340,817

(22) Filed: Dec. 30, 2011

(65) Prior Publication Data

US 2013/0173768 A1    Jul. 4, 2013

(51) Int. Cl.
G06F 15/173    (2006.01)
G06F 9/50    (2006.01)
H04L 12/24    (2006.01)

(52) U.S. Cl.
CPC ............ *G06F 9/5077* (2013.01); *H04L 41/046* (2013.01); *H04L 41/0806* (2013.01)

(58) Field of Classification Search
CPC .......................... H04L 41/046; H04L 41/0806
USPC ........................................................ 709/223
See application file for complete search history.

(56) References Cited

U.S. PATENT DOCUMENTS

| | | | |
|---|---|---|---|
| 7,483,978 B2 | 1/2009 | Esfahany et al. | |
| 7,603,327 B2 | 10/2009 | Esfahany | |
| 7,831,689 B2 * | 11/2010 | Poisson | H04L 12/4633 379/268 |
| 7,912,955 B1 | 3/2011 | Machiraju et al. | |
| 7,941,510 B1 | 5/2011 | Tormasov et al. | |
| 8,769,058 B1 * | 7/2014 | Barker et al. | 709/220 |
| 8,880,657 B1 * | 11/2014 | Angrish et al. | 709/220 |
| 2008/0244579 A1 | 10/2008 | Muller | |
| 2010/0211669 A1 * | 8/2010 | Dalgas et al. | 709/224 |
| 2011/0154324 A1 * | 6/2011 | Pagan et al. | 718/1 |
| 2011/0167421 A1 * | 7/2011 | Soundararajan et al. | 718/1 |
| 2011/0246987 A1 * | 10/2011 | Diwakar et al. | 718/1 |
| 2012/0016973 A1 * | 1/2012 | Haris et al. | 709/220 |
| 2012/0144044 A1 * | 6/2012 | Verma | 709/227 |
| 2012/0240181 A1 * | 9/2012 | McCorkendale et al. | 726/1 |
| 2013/0026220 A1 * | 1/2013 | Whelihan | 235/375 |
| 2013/0063592 A1 * | 3/2013 | Kingsley | 348/143 |
| 2013/0219060 A1 * | 8/2013 | Sturgeon et al. | 709/224 |
| 2013/0238795 A1 * | 9/2013 | Geffin et al. | 709/224 |
| 2013/0339528 A1 * | 12/2013 | Niemoeller et al. | 709/226 |

* cited by examiner

*Primary Examiner* — Richard G Keehn
(74) *Attorney, Agent, or Firm* — Larson Newman, LLP (57) ABSTRACT

A datacenter management server includes a datacenter operations manager and a datacenter infrastructure manager with an infrastructure viewer and an asset deployment tool. The datacenter operations manager compiles datacenter hierarchy information for a datacenter, including identity information for a virtualized environment and identity information for a virtualization capable system. The virtualization capable system is deployed as a stand-alone system of the datacenter. The datacenter infrastructure manager receives the datacenter hierarchy information, directs the infrastructure viewer to display a hierarchical overview of the datacenter, including depictions of the virtualized environment and the virtualization capable system. The hierarchical overview is based on the identity information. The datacenter infrastructure manager also receives a selection of the depictions from a user and directs the asset deployment tool to deploy the virtualization capable system to the virtualized environment.

20 Claims, 4 Drawing Sheets

SYSTEM AND METHOD FOR DETECTION AND DEPLOYMENT OF VIRTUALIZATION CAPABLE ASSETS IN A MANAGED DATACENTER

FIELD OF THE DISCLOSURE

The present disclosure generally relates to information handling systems, and more particularly relates to detection and deployment of virtualization capable assets in a managed datacenter.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
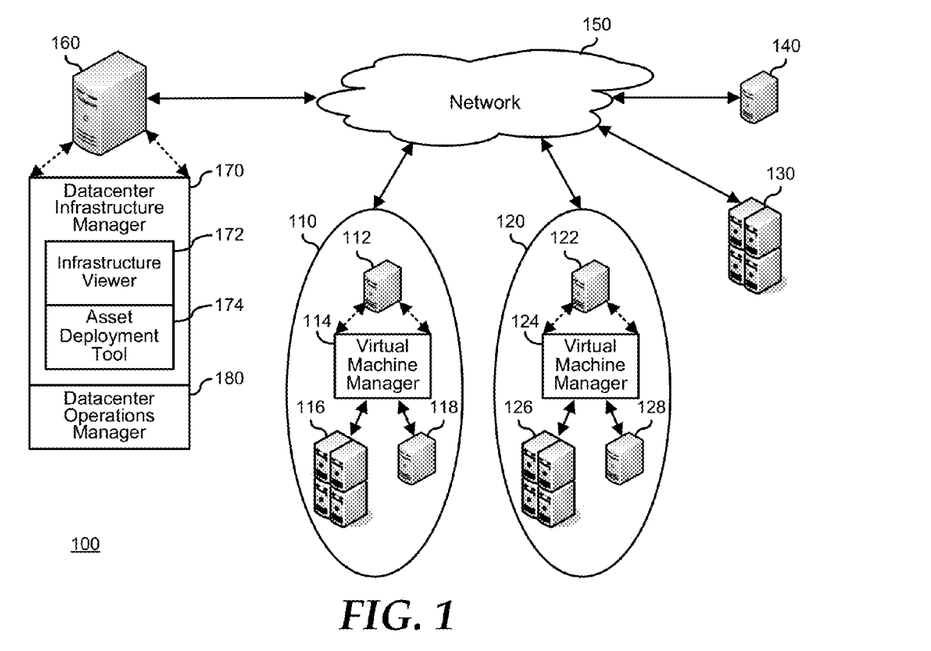
FIG. 1 is a block diagram of a managed datacenter according to an embodiment of the present disclosure.

FIG. 1 illustrates a managed datacenter 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, managed datacenter 100 includes a virtual machine environment 110, one or more additional virtual machine environments 120, a stand-alone cluster 130, a stand-alone server 140, a network 150, and a datacenter management server 160. Managed datacenter 100 can also include one or more additional stand-alone clusters and one or more stand-alone servers. Virtual machine environments 110 and 120, stand-alone cluster 130, and stand-alone server 140 are connected to network 150 to provide an information processing capability that is managed by datacenter management server 160. A non-limiting example of a network 150 includes a Small Computer System Interface (SCSI) fabric, a Fibre Channel (FC) fabric, an Internet SCSI (iSCSI) fabric, another data fabric or any combination thereof.

Virtual machine environment 110 includes a virtualization management server 112 that includes a virtual machine manager 114 (VMM) for managing a virtualized cluster 116, and a virtualized server 118. Virtual machine environment 110 can also include one or more virtualized clusters and one or more virtualized servers, and associated storage resources, as needed or desired. Virtual machine environment 110 operates to provide the resources of the virtual machine environment to perform computing services for managed datacenter 100, such as web hosting, database processing, electronic mail and chat services, or other computing services, as needed or desired. VMM 114 launches and maintains virtual machines on the processing resources of virtualized cluster 116 and virtualized server 118, and each virtual machine is allocated to perform one or more of the computing services in the form of workloads that are executed on the virtual machines. VMM 114 can include a commercial virtual machine management suite, such as Microsoft® System Center Virtual Machine Manager (SCVMM), VMware® vCenter™, Novell® ZENworks®, or another commercial virtual machine management suite, as needed or desired. Virtualized cluster 116 and virtualized server 118 include operating systems that are capable of operating in a virtualized environment, such as Microsoft®

Windows Server® 2008 (Win2k8), VMware® ESXi, Xen® Hypervisor, or another virtualization capable operating system, as needed or desired.

Virtual machine environment 120 includes a virtualization management server 122 similar to virtualization management server 112, and that includes VMM 124 similar to VMM 114, and that manages a virtualized cluster 126, and a virtualized server 128. Virtual machine environment 120 can also include one or more virtualized clusters and one or more virtualized servers, and associated storage resources, as needed or desired. Virtual machine environment 120 operates similarly to virtual machine environment 110. Stand-alone cluster 130 and stand-alone server 140 operate to perform computing services for managed datacenter 100 in a dedicated manner, providing functions such as one or more of a dedicated web server, database server, electronic mail or chat server, or another type of server, as needed or desired. Stand-alone cluster 130 and stand-alone server 140 can include operating systems that are capable of operating in virtualized environment 110 or 120, or can include operating systems that preclude their operation in a virtualized environment, as needed or desired Datacenter management server 160 includes a datacenter infrastructure manager 170, and a datacenter operations manager 180. Datacenter infrastructure manager 170 includes an infrastructure viewer 172 and an asset deployment tool 174. Datacenter operations manager 180 provides a cross-platform management system for managed datacenter 100, including datacenter state, health, and tracking capabilities, resource configuration and allocation capabilities, and alert and warning capabilities. An example of datacenter operations manager 180 includes Microsoft® System Center Operations Manager (SCOM), Intel® Data Center Manager, other datacenter management suites, or a combination thereof.

In a particular embodiment, datacenter operations manager 180 operates to discover the resources of managed datacenter 100. As such, datacenter operations manager 180 discovers virtualization management servers 112 and 122, virtualized clusters 116 and 126, virtualized servers 118 and 128, stand-alone cluster 130, and stand-alone server 140. Further, datacenter operations manager 180 determines that virtualized cluster 116 and virtualized server 118 are associated with virtualized environment 110 that is managed by virtualization management server 112 and VMM 114, that virtualized cluster 126 and virtualized server 128 are associated with virtualized environment 120 that is managed by virtualization management server 122 and VMM 124, and that stand-alone cluster 130 and stand-alone server 140 are not associated with virtualized environments 110 or 120.

Datacenter operations manager 180 also operates to inventory the discovered resources of the managed datacenter. As such, datacenter operations manager 180 inventories the hardware and software that are included in virtualization management servers 112 and 122, virtualized clusters 116 and 126, virtualized servers 118 and 128, stand-alone cluster 130, and stand-alone server 140. Further, datacenter operations manager 180 inventories the operating systems that are included in virtualization management servers 112 and 122, virtualized clusters 116 and 126, virtualized servers 118 and 128, stand-alone cluster 130, and stand-alone server 140. In particular, datacenter operations manager 180 determines which commercial virtual machine management suite is operating on virtualization management servers 112 and 122, and which virtualization capable operating system is operating on virtualized clusters 116 and 126 and virtualized servers 118 and 128. Datacenter operations manager 180 also determines whether or not stand-alone cluster 130 and stand-alone server 140 have virtualization capable operating systems operating thereon, and if so which virtualization capable operating system is operating. In a particular embodiment, an operating system operating on one or more of stand-alone cluster 130 and stand-alone server 140 can be a virtualization capable operating system, but can be in a state where the virtualization capability is disabled. In this case, datacenter operations manager 180 determines the state of the operating system of stand-alone cluster 130 and stand-alone server 140.

Figure 4:
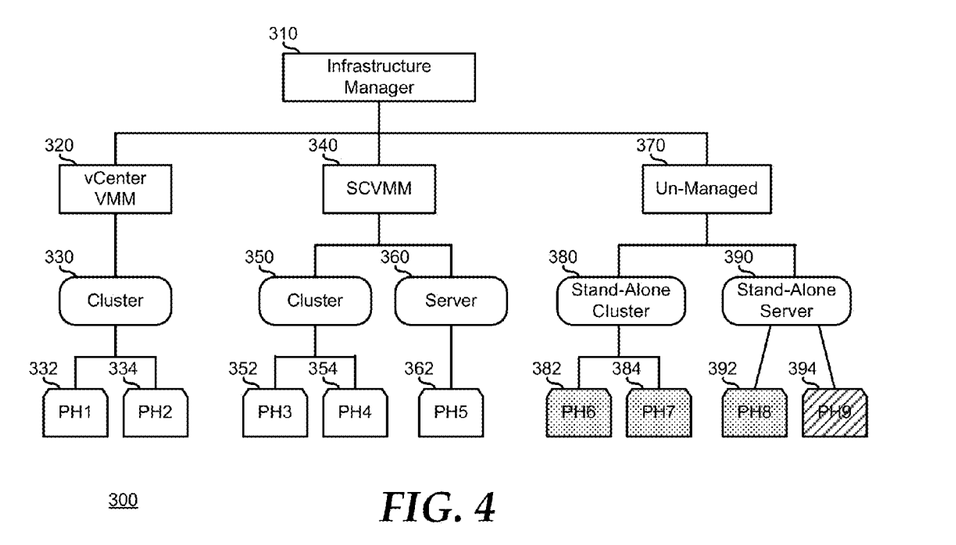
FIGS. 4 and 5 illustrate a hierarchical overview of the managed datacenter of FIG. 1 according to an embodiment of the present disclosure.

Datacenter infrastructure manager 170 provides a cross-platform framework in which support personnel of managed datacenter 100 operate to identify virtualization capable resources of the managed datacenter, to determine the operating state of the virtualization capable resources, and if any of the virtualization capable resources are not deployed within a virtualized environment, to deploy the virtualization capable resources to a virtualized environment. In particular, datacenter infrastructure manager 170 receives datacenter hierarchy information from datacenter operations manager 180. The datacenter hierarchy information includes the list of resources of managed datacenter 100, the associations of the resources, and the inventory of the resources. The datacenter hierarchy information is used by infrastructure viewer 172 to construct a hierarchical overview of managed datacenter 100, as shown in FIG. 4 and described below. Infrastructure viewer 172 provides the hierarchical overview of managed datacenter 100 to support personnel of the managed datacenter in the form of a user interface. The user interface permits the support personnel to select virtualization capable resources, to select to enable the virtualization capabilities of the selected resources, to select a virtualized environment, and to select to deploy the selected resources to the selected virtualized environment. Asset deployment tool 174 operates to receive the selections from the user interface, to enable the virtualization capabilities of the selected resources, and to deploy the selected resources to the selected virtualized environment.

Figure 2:
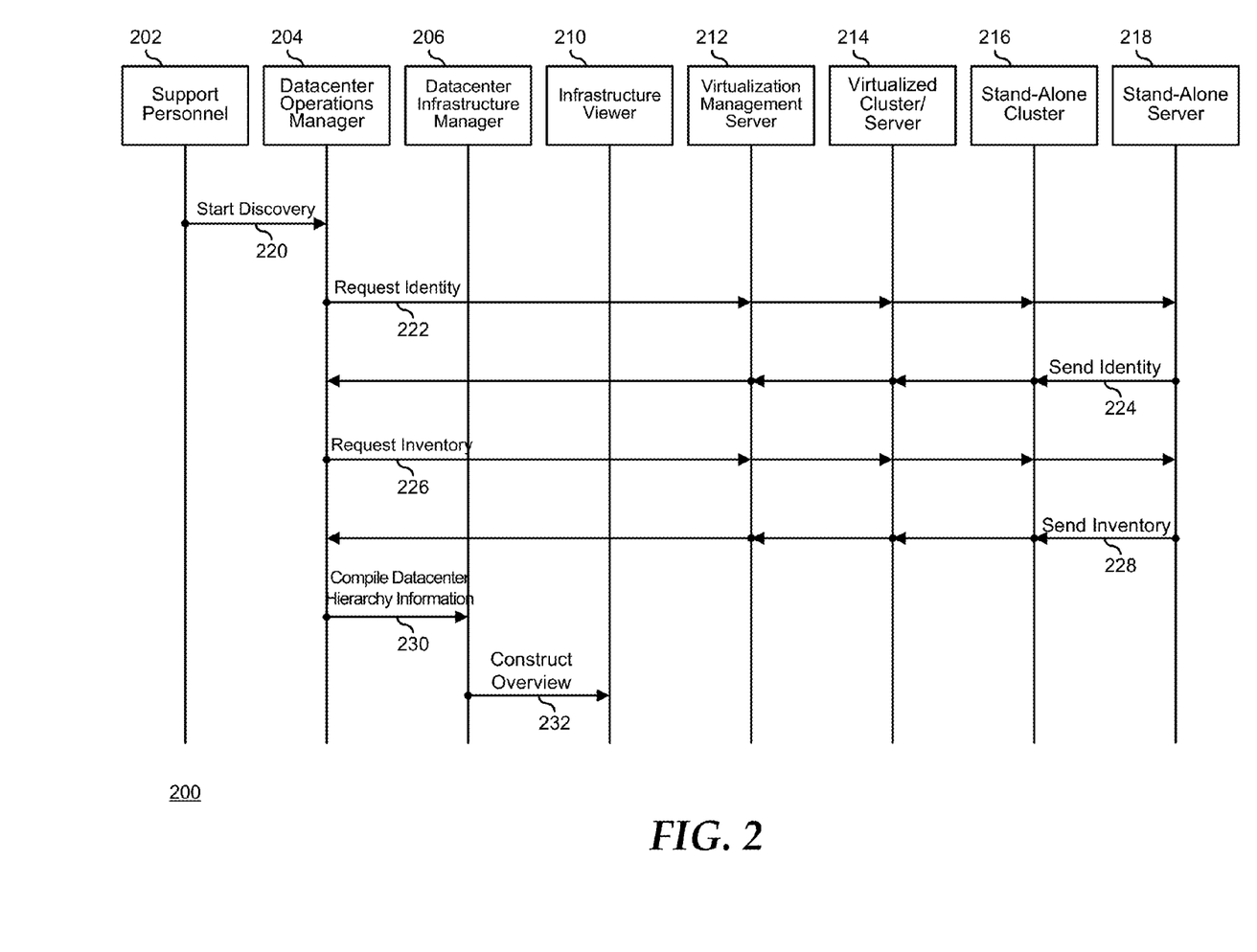
FIGS. 2 and 3 illustrate a method of detecting and deploying virtualization capable assets in the managed datacenter of FIG. 1 according to an embodiment of the present disclosure.
Figure 3:
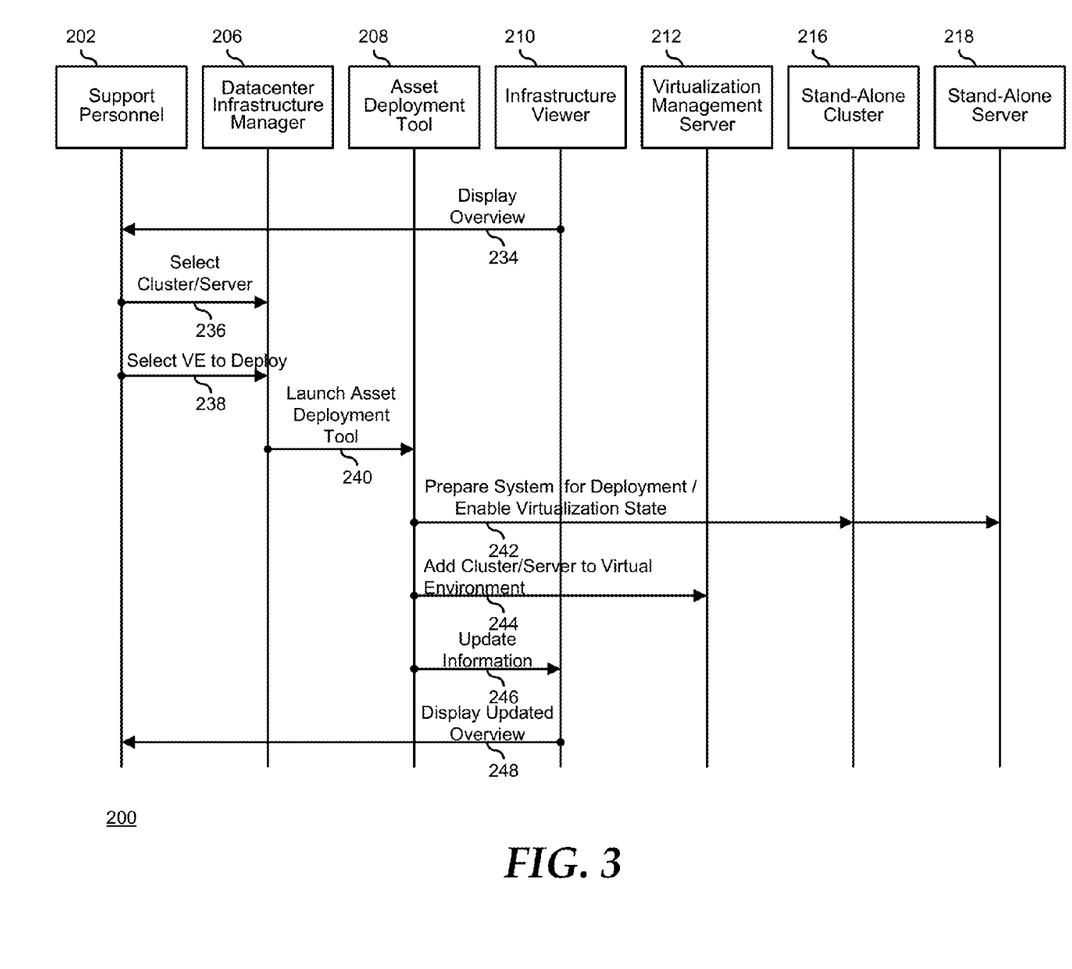

FIGS. 2 and 3 illustrate a method of gathering datacenter hierarchy information of the resources of managed datacenter 100 to construct a hierarchical overview of the managed datacenter, to receive selections from the support personnel, and to enable the virtualization capabilities and to deploy the selected resources to the selected virtualized environment. Here, actions performed by elements of managed datacenter 100 are represented in blocks 202 through 218. Block 202 represents support personnel of the managed datacenter, block 204 represents datacenter operations manager 180, block 206 represents datacenter infrastructure manager 170, block 208 represents asset deployment tool 174, block 210 represents infrastructure viewer 172, block 212 represents virtualization management servers 112 and 122, block 214 represents virtualized clusters 116 and 126 and virtualized servers 118 and 128, block 216 represents stand-alone cluster 130, and block 218 represents stand-alone server 140.

Support personnel 202 initiate a discovery process on datacenter operations manager 204 in step 220. Datacenter operations manager 204 issues requests for the identities of virtualization management servers 212, virtualized cluster and servers 214, stand-alone cluster 216, and stand-alone server 218 in step 222. Virtualization management servers 212, virtualized cluster and servers 214, stand-alone cluster 216, and stand-alone server 218 provide their identities to datacenter operations manager 204 in step 224. Virtualized cluster and servers 214 also provide their associations to datacenter operations manager 204 in step 224. Datacenter operations manager 204 issues requests for the inventories of virtualization management servers 212, virtualized cluster and servers 214, stand-alone cluster 216, and stand-alone server 218 in step 226. Virtualization management servers 212, virtualized cluster and servers 214, stand-alone cluster 216, and stand-alone server 218 provide their inventories to datacenter operations manager 204 in step 228. The inventories include the hardware, software, operating systems, commercial virtual machine management suites, and virtualization capable operating systems and operating states. Datacenter operations manager 204 compiles the inventory into datacenter hierarchy information and provides the datacenter hierarchy information to datacenter infrastructure manager 206 in step 230. Datacenter infrastructure manager 206 provides the datacenter hierarchy information to infrastructure viewer 210 in step 232. Infrastructure viewer 210 constructs a hierarchical overview of managed datacenter 100.

FIG. 4 illustrates an example of a hierarchical overview 300 of managed datacenter 100, including a depiction of infrastructure manager 310 providing cross-platform management of a vCenter VMM environment 320, an SCVMM environment 340, and an unmanaged environment 370. vCenter environment 320 includes a cluster 330 having systems 332 and 334. SCVMM environment 340 includes a cluster 350 having systems 352 and 354, and a server 360 having a system 362. Unmanaged environment 370 includes a stand-alone cluster 380 having systems 382 and 384, and stand-alone servers 390 including systems 392 and 394. Here, hierarchical overview 300 indicates that systems 382, 384, and 392 are virtualization capable resources of managed datacenter 100, and that system 394 is not a virtualization capable resource.

Referring again to FIG. 3, infrastructure viewer 210 provides hierarchical overview 300 to support personnel 202 in step 234. Hierarchical overview 300 operates as a user interface, permitting support personnel 202 to make a selection of one or more available virtualization capable resource and to select to enable the virtualization capabilities of the selected resources. The selected virtualization capable resources are communicated to datacenter infrastructure manager 206 in step 236. Hierarchical overview 300 also permits support personnel 202 to make a selection of which virtualization environment the selected virtualization capable resources are to be deployed. The selected virtualization environments are communicated to datacenter infrastructure manager 206 in step 238. Datacenter infrastructure manager 206 launches asset deployment tool 208 in step 240. Launching asset deployment tool 208 includes providing the asset deployment tool with the selected virtualization capable resources, the virtualization state of the selected resources, and the selected virtualization environment into which the selected virtualization capable resources are to be deployed. Asset deployment tool 208 prepares the selected virtualization capable resource, that is the selected one or more of stand-alone cluster 216 and stand-alone server 218, for deployment, and if necessary enables the virtualization state of the selected virtualization resource in step 242. Asset deployment tool 208 directs the selected virtualization environment, that is the selected virtualization management server 212, to add the selected virtualization capable resource to the selected virtualization environment in step 244. Asset deployment tool 208 provides the updated datacenter hierarchy information to infrastructure viewer 210 in step 246. Infrastructure viewer 210 provides an updated hierarchical overview to support personnel 202 in step 248.

Figure 5:
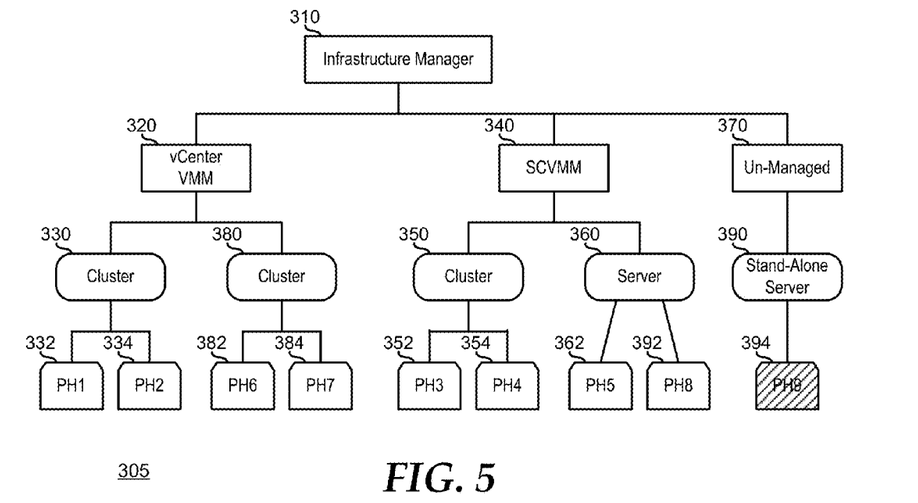

FIG. 5 illustrates an example of the updated hierarchical overview 305 of managed datacenter 100. Here, cluster 380 and systems 382 and 384 have been deployed to vCenter VMM environment 320, and system 392 has been deployed to SCVMM environment 340. Because system 394 is not a virtualization capable resource, it is still depicted as part of unmanaged environment 370.

Figure 6:
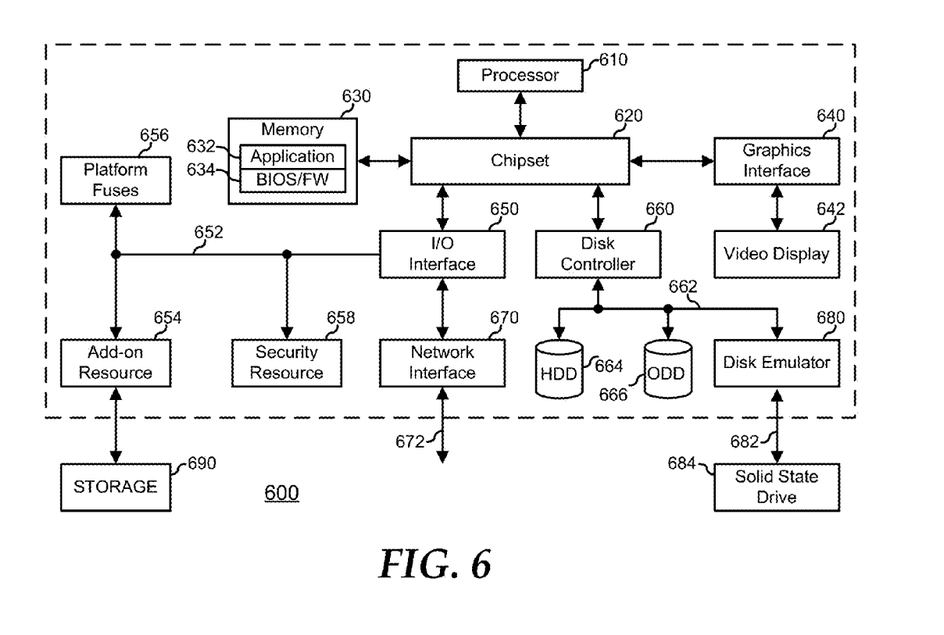
FIG. 6 is a block diagram illustrating an information handling system according to an embodiment of the present disclosure.

FIG. 6 is a block diagram illustrating an embodiment of an information handling system 600, including a processor 610, a chipset 620, a memory 630, a graphics interface 640, an input/output (I/O) interface 650, a disk controller 660, a network interface 670, and a disk emulator 680. In a particular embodiment, information handling system 600 is used to carry out one or more of the methods described herein. In another embodiment, one or more of the systems described herein are implemented in the form of information handling system 600.

Chipset 620 is connected to and supports processor 610, allowing the processor to execute machine-executable code. In a particular embodiment (not illustrated), information handling system 600 includes one or more additional processors, and chipset 620 supports the multiple processors, allowing for simultaneous processing by each of the processors and permitting the exchange of information among the processors and the other elements of the information handling system. Chipset 620 can be connected to processor 610 via a unique channel, or via a bus that shares information among the processor, the chipset, and other elements of information handling system 600.

Memory 630 is connected to chipset 620. Memory 630 and chipset 620 can be connected via a unique channel, or via a bus that shares information among the chipset, the memory, and other elements of information handling system 600. In another embodiment (not illustrated), processor 610 is connected to memory 630 via a unique channel. In another embodiment (not illustrated), information handling system 600 includes separate memory dedicated to each of the one or more additional processors. A non-limiting example of memory 630 includes static random access memory (SRAM), dynamic random access memory (DRAM), non-volatile random access memory (NVRAM), read only memory (ROM), flash memory, another type of memory, or any combination thereof.

Graphics interface 640 is connected to chipset 620. Graphics interface 640 and chipset 620 can be connected via a unique channel, or via a bus that shares information among the chipset, the graphics interface, and other elements of information handling system 600. Graphics interface 640 is connected to a video display 642. Other graphics interfaces (not illustrated) can also be used in addition to graphics interface 640 as needed or desired. Video display 642 includes one or more types of video displays, such as a flat panel display, another type of display device, or any combination thereof.

I/O interface 650 is connected to chipset 620. I/O interface 650 and chipset 620 can be connected via a unique channel, or via a bus that shares information among the chipset, the I/O interface, and other elements of information handling system 600. Other I/O interfaces (not illustrated) can also be used in addition to I/O interface 650 as needed or desired. I/O interface 650 is connected via an I/O interface 652 to one or more add-on resources 654. Add-on resource 654 is connected to a storage system 690, and can also include another data storage system, a graphics interface, a network interface card (NIC), a sound/video processing card, another suitable add-on resource or any combination thereof. I/O interface 650 is also connected via I/O interface 652 to one or more platform fuses 656 and to a security resource 658. Platform fuses 656 function to set or modify the functionality of information handling system 600 in hardware. Security resource 658 provides a secure cryptographic functionality and includes secure storage of cryptographic keys. A non-limiting example of security resource 658 includes a Unified Security Hub (USH), a Trusted Platform Module (TPM), a General Purpose Encryption (GPE) engine, another security resource, or a combination thereof.

Disk controller 660 is connected to chipset 620. Disk controller 660 and chipset 620 can be connected via a unique channel, or via a bus that shares information among the chipset, the disk controller, and other elements of information handling system 600. Other disk controllers (not illustrated) can also be used in addition to disk controller 660 as needed or desired. Disk controller 660 includes a disk interface 662. Disk controller 660 is connected to one or more disk drives via disk interface 662. Such disk drives include a hard disk drive (HDD) 664, and an optical disk drive (ODD) 666, and can include one or more disk drive as needed or desired. ODD 666 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 660 is connected to disk emulator 680. Disk emulator 680 permits a solid-state drive 684 to be coupled to information handling system 600 via an external interface 682. External interface 682 can include industry standard busses such as USB or IEEE 1394 (Firewire) or proprietary busses, or any combination thereof. Alternatively, solid-state drive 684 can be disposed within information handling system 600.

Network interface device 670 is connected to I/O interface 650. Network interface 670 and I/O interface 650 can be coupled via a unique channel, or via a bus that shares information among the I/O interface, the network interface, and other elements of information handling system 600. Other network interfaces (not illustrated) can also be used in addition to network interface 670 as needed or desired. Network interface 670 can be a network interface card (NIC) disposed within information handling system 600, on a main circuit board such as a baseboard, a motherboard, or any combination thereof, integrated onto another component such as chipset 620, in another suitable location, or any combination thereof. Network interface 670 includes a network channel 672 that provide interfaces between information handling system 600 and other devices (not illustrated) that are external to information handling system 600. Network interface 670 can also include additional network channels (not illustrated).

Information handling system 600 includes one or more application programs 632, and Basic Input/Output System and Firmware (BIOS/FW) code 634. BIOS/FW code 634 functions to initialize information handling system 600 on power up, to launch an operating system, and to manage input and output interactions between the operating system and the other elements of information handling system 600. In a particular embodiment, application programs 632 and BIOS/FW code 634 reside in memory 630, and include machine-executable code that is executed by processor 610 to perform various functions of information handling system 600. In another embodiment (not illustrated), application programs and BIOS/FW code reside in another storage medium of information handling system 600. For example, application programs and BIOS/FW code can reside in HDD 664, in a ROM (not illustrated) associated with information handling system 600, in an option-ROM (not illustrated) associated with various devices of information handling system 600, in storage system 690, in a storage system (not illustrated) associated with network channel 672, in another storage medium of information handling system 600, or a combination thereof. Application programs 632 and BIOS/FW code 634 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A datacenter management server, comprising:
   a memory device including processor-executable code; and
   a processor operable to execute code to implement:
   a datacenter operations manager that compiles datacenter hierarchy information for a datacenter, the datacenter hierarchy information including:
   first identity information for a first virtualized environment of the datacenter;
   first resource information for a first resource of the first virtualized environment;
   second identity information for a second virtualized environment of the data center;
   second resource information for a second resource of the second virtualized environment; and
   third identity information for a virtualization capable system of the datacenter, wherein the virtualization capable system is deployed as a stand-alone system of the datacenter, wherein the first, second, and third identity information, and the first and second resource information is arranged according to a hierarchy of elements of the data center; and
   a datacenter infrastructure manager including an infrastructure viewer and an asset deployment tool, wherein the datacenter infrastructure manager:
   receives the datacenter hierarchy information from the datacenter operations manager;
   directs the infrastructure viewer to display a hierarchical overview of the datacenter, wherein the hierarchical overview includes a first depiction of the first virtualized environment including the first resource, a second depiction of the second virtualized environment including the second resource, and a third depiction of the virtualization capable system, and the hierarchical overview is based on the first, second, and third identity information;
   receives a first selection of one of the first and second depictions;
   receives a second selection of the third depiction;
   receives a third selection of one of the first and second resources; and
   in response to receiving the first, second, and third selections, directs the asset deployment tool to deploy the virtualization capable system to the selected virtualized environment and to deploy the selected resource to the selected virtualized environment.

2. The datacenter management server of claim 1, wherein in deploying the virtualization capable system to the virtualized environment, the asset deployment tool further:
   prepares the virtualization capable system for deployment to the virtualized environment by setting the virtualization capable system to a virtualization capable operating state; and
   provides updated datacenter hierarchy information to the infrastructure viewer.

3. The datacenter management server of claim 2, wherein in response to receiving the updated datacenter hierarchy information, the infrastructure viewer displays an updated hierarchical overview of the datacenter, wherein the updated hierarchical overview includes a fourth depiction of the virtualization capable system as being deployed on the selected virtualized environment.

4. The datacenter management server of claim 1, wherein the datacenter hierarchy information further includes:
   first inventory information for the first virtualized environment; and
   second inventory information for the virtualization capable system.

5. The datacenter management server of claim 4, wherein the second inventory information includes a virtualization capable operating state for the virtualization capable system.

6. The datacenter management server of claim 1, wherein compiling the datacenter hierarchy information is in response to receiving at the datacenter infrastructure manager a request to discover the first virtualized environment and the virtualization capable system.

7. The datacenter management server of claim 1, wherein the virtualization capable system includes an operating system that is capable of operating in the virtualized environment.

8. The datacenter management server of claim 1, wherein, when the virtualization capable system is deployed as a stand-alone system of the datacenter, the virtualization capable system is operating as at least one of a web server, database server, and electronic mail server, and a chat server.

9. A method of detecting and deploying virtualization capable assets in a datacenter, the method comprising:
   determining by a datacenter operations server a datacenter hierarchy information, the datacenter hierarchy information including:
   first identity information for a first virtualized environment of the datacenter;
   first resource information for a first resource of the first virtualized environment;
   second identity information for a second virtualized environment of the data center;
   second resource information for a second resource of the second virtualized environment; and
   third identity information for a virtualization capable system of the datacenter, wherein the virtualization capable system is deployed as a stand-alone system of the datacenter, wherein the first, second, and third identity information, and the first and second resource information is arranged according to a hierarchy of elements of the data center; and
   receiving at a datacenter infrastructure manager the datacenter hierarchy information from the datacenter operations server;
   directing an infrastructure viewer to display a hierarchical overview of the datacenter, wherein the hierarchical overview includes a first depiction of the first virtualized environment including the first resource, a second depiction of the second virtualized environment including the second resource, and a third depiction of the virtualization capable system, and the hierarchical overview is based on the first, second, and third identity information;
   receiving at the datacenter infrastructure manager a first selection of one of the first and second depictions;
   receiving a second selection of the third depiction;
   receiving a third selection of one of the first and second resources; and
   in response to receiving the first and second selections, deploying the virtualization capable system to the selected virtualized environment and deploying the selected resource to the selected virtualized environment.

10. The method of claim 9, wherein in deploying the virtualization capable system to the virtualized environment, the method further comprises:

preparing by the asset deployment tool the virtualization capable system for deployment to the virtualized environment by setting the virtualization capable system to a virtualization capable operating state; and providing updated datacenter hierarchy information to the infrastructure viewer.

11. The method of claim 10, wherein in response to receiving the updated datacenter hierarchy information, the method further comprises displaying an updated hierarchical overview of the datacenter, wherein the updated hierarchical overview includes a fourth depiction of the virtualization capable system as being deployed on the selected virtualized environment.

12. The method of claim 9, wherein the datacenter hierarchy information further includes:

first inventory information for the first virtualized environment; and second inventory information for the virtualization capable system.

13. The method of claim 12, wherein the second inventory information includes a virtualization capable operating state for the virtualization capable system.

14. The method of claim 9, wherein compiling the datacenter hierarchy information is in response to receiving at the datacenter infrastructure manager a request to discover the first virtualized environment and the virtualization capable system.

15. A non-transitory storage medium having code for carrying out a method, the method comprising:

compiling, by a datacenter operations server, datacenter hierarchy information, the data center hierarchy information includes:

first identity information for a first virtualized environment of a datacenter;

first resource information for a first resource of the first virtualized environment;

second identity information for a second virtualized environment of the data center;

second resource information for a second resource of the second virtualized environment; and third identity information for a virtualization capable system of the datacenter, wherein the virtualization capable system is deployed as a stand-alone system of the datacenter, wherein the first, second, and third identity information, and the first and second resource information is arranged according to a hierarchy of elements of the data center; and receiving the datacenter hierarchy information;

directing an infrastructure viewer to display a hierarchical overview of the datacenter, wherein the hierarchical overview includes a first depiction of the first virtualized environment including the first resource, a second depiction of the second virtualized environment including the second resource, and a third depiction of the virtualization capable system, and the hierarchical overview is based on the first, second, and third identity information;

receiving a first selection of one of the first and second depictions;

receiving a second selection of the third depiction;

receiving a third selection of one of the first and second resources; and in response to receiving the first and second selections, deploying the virtualization capable system to the selected virtualized environment and deploying the selected resource to the selected virtualized environment.

16. The storage medium of claim 15, wherein in deploying the virtualization capable system to the virtualized environment, the method further comprises:

preparing by the asset deployment tool the virtualization capable system for deployment to the virtualized environment by setting the virtualization capable system to a virtualization capable operating state; and providing updated datacenter hierarchy information to the infrastructure viewer.

17. The storage medium of claim 16, wherein in response to receiving the updated datacenter hierarchy information, the method further comprises displaying an updated hierarchical overview of the datacenter, wherein the updated hierarchical overview includes a fourth depiction of the virtualization capable system as being deployed on the selected virtualized environment.

18. The storage medium of claim 15, wherein the datacenter hierarchy information further includes:

first inventory information for the first virtualized environment; and second inventory information for the virtualization capable system.

19. The storage medium of claim 18, wherein the second inventory information includes a virtualization capable operating state for the virtualization capable system.

20. The storage medium of claim 15, wherein compiling the datacenter hierarchy information is in response to receiving at the datacenter infrastructure manager a request to discover the first virtualized environment and the virtualization capable system.

* * * * *